United States Patent
Han et al.

(10) Patent No.: US 11,816,209 B1
(45) Date of Patent: Nov. 14, 2023

(54) SYSTEMS AND METHODS FOR PROTECTING DATA ON DEVICES

(71) Applicant: NORTONLIFELOCK INC., Tempe, AZ (US)

(72) Inventors: Yufei Han, Antibes (FR); Kevin Roundy, El Segundo, CA (US); Acar Tamersoy, Culver City, CA (US); Daniel Kats, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 333 days.

(21) Appl. No.: 17/166,925

(22) Filed: Feb. 3, 2021

(51) Int. Cl.
| | | |
|---|---|---|
| *G06F 21/55* | (2013.01) |
| *G06F 21/56* | (2013.01) |
| *G06F 21/31* | (2013.01) |
| *G06F 21/62* | (2013.01) |
| *G06F 21/54* | (2013.01) |

(52) U.S. Cl.
CPC .......... *G06F 21/554* (2013.01); *G06F 21/31* (2013.01); *G06F 21/54* (2013.01); *G06F 21/566* (2013.01); *G06F 21/6245* (2013.01)

(58) Field of Classification Search
CPC ........ G06F 21/554; G06F 21/31; G06F 21/54; G06F 21/566; G06F 21/6245; G06F 21/6263
See application file for complete search history.

(56) References Cited

U.S. PATENT DOCUMENTS

| | | | | |
|---|---|---|---|---|
| 2014/0007222 A1* | 1/2014 | Qureshi | .................. | H04L 67/10 726/16 |
| 2018/0359811 A1* | 12/2018 | Verzun | .................. | H04W 28/12 |
| 2019/0386969 A1* | 12/2019 | Verzun | .................. | G06F 21/606 |

FOREIGN PATENT DOCUMENTS

| | | | | |
|---|---|---|---|---|
| CN | 111247773 A | * | 6/2020 | ............. H04L 45/24 |

OTHER PUBLICATIONS

"DocuSAFE: Documentation and Evidence Collection App", URL: https://www.techsafety.org/docusafe, Technology Safety, retrieved on Jan. 15, 2021, 7 pages.

* cited by examiner

*Primary Examiner* — Matthew Smithers
*Assistant Examiner* — Shu Chun Gao
(74) *Attorney, Agent, or Firm* — Greenberg Traurig, LLP

(57) ABSTRACT

A computer-implemented method for protecting data on devices may include (i) identifying a device that is operated by a user and that comprises private data pertaining to the user, (ii) determining that stalkerware on the device is sending the private data to an unauthorized device not operated by the user, (iii) requesting, in response to determining that the stalkerware is sending the private data to the unauthorized device, that the user select at least one safety plan step from a set of safety plan options, and (iv) modifying, at least in part based on the safety plan step selected by the user, outgoing data sent by the stalkerware to the unauthorized device. Various other methods, systems, and computer-readable media are also disclosed.

20 Claims, 8 Drawing Sheets

SYSTEMS AND METHODS FOR PROTECTING DATA ON DEVICES

BACKGROUND

Technology-enabled abuse is an increasingly common feature of intimate partner violence. Technology-enabled abuse often features abusive mobile applications, such as stalkerware apps that perform detailed surveillance of a victim's device and collect information ranging from the victim's current location to the victim's financial data. Victims may face different levels and types of threats, depending on whether they are living with their abuser currently, are financially dependent on their abuser, have separated from their abuser but still live nearby, or are physically far removed from their abuser. The proximity of the victim to the abuser may also affect the level of physical access that the abuser has to the victim's devices, such as mobile phones.

A fully automated solution that removes any type of malware, including stalkerware, from a device may be sufficient for a victim who is far away from their abuser but may place a victim who still lives with their abuser in physical danger when the abuser determines that the stalkerware is no longer functioning. Even in situations outside of intimate partner violence, a user may have various reasons for not wanting to immediately and automatically remove stalkerware discovered on their device. Accordingly, the instant disclosure identifies and addresses a need for additional and improved systems and methods for protecting data on devices in accordance with a user's situation.

SUMMARY

As will be described in greater detail below, the instant disclosure generally relates to systems and methods for protecting data on devices by identifying stalkerware that is transmitting private data and then creating a custom safety plan to protect the user from the owner of the stalkerware while taking steps to mitigate the damage done by the stalkerware itself.

In one example, a computer-implemented method for protecting data on devices may include (i) identifying a device that is operated by a user and that includes private data pertaining to the user, (ii) determining that stalkerware on the device is sending the private data to an unauthorized device not operated by the user, (iii) requesting, in response to determining that the stalkerware is sending the private data to the unauthorized device, that the user select at least one safety plan step from a set of safety plan options, and (iv) modifying, at least in part based on the safety plan step selected by the user, outgoing data sent by the stalkerware to the unauthorized device.

In some examples, the private data pertaining to the user may include data collected by a hardware element of the device, such as (i) audio data collected by a microphone of the device, (ii) visual data collected by a camera of the device, and/or (iii) location data collected by a location tracker of the device. Additionally or alternatively, the private data pertaining to the user may include (i) financial data, (ii) telecommunication data, (iii) social media data, and/or (iv) contact list data.

In some examples, requesting that the user select at least one safety plan step from the set of safety plan options may include identifying at least one characteristic of the stalkerware and generating the set of safety plan options based on the characteristic. In one embodiment, the set of safety plan options may include (i) an option to delete the stalkerware, (ii) an option to filter data accessible to the stalkerware, and/or (iii) an option to spoof data from the stalkerware. Additionally or alternatively, the set of safety plan options may include (i) an option to provide an emergency contact, (ii) an option to update authentication information on at least one platform, and/or (iii) an option to initiate protection of personal information stored on third-party platforms.

In some examples, requesting that the user select the at least one safety plan step may include querying the user about (i) the user's physical safety, (ii) the user's proximity to a suspected operator of the unauthorized device, (iii) a level of access that a suspected operator of the unauthorized device has to the device, and/or (iv) a level of access that a suspected operator of the unauthorized device has to accounts owned by the user. In some embodiments, determining that the stalkerware on the device is sending the private data to the unauthorized device not operated by the user may include determining that the unauthorized device is operated by a personal associate of the user.

In some examples, modifying the outgoing data sent by the stalkerware to the unauthorized device may include preventing the stalkerware from sending data indicating that the stalkerware has been deleted from the device and deleting the stalkerware. In one example, modifying the outgoing data sent by the stalkerware to the unauthorized device may include filtering incoming data to the stalkerware to limit at least one of the quantity or accuracy of the outgoing data sent by the stalkerware.

Additionally or alternatively, modifying the outgoing data sent by the stalkerware to the unauthorized device may include (i) monitoring behavior of the user on the device over a period of time to build a profile of data generated by the user, (ii) generating spoofed data based on the profile of data generated by the user, and (iii) replacing the outgoing data sent by the stalkerware with the spoofed data. In some examples, modifying the outgoing data sent by the stalkerware to the unauthorized device may include identifying a subset of the private data that includes a higher level of potential harm to the user if transmitted to the unauthorized device compared to private data not in the subset and filtering the subset of the private data from the outgoing data while allowing the stalkerware to continue sending the private data not in the subset.

In one embodiment, the computer-implemented method may further include (i) recording responses from the user to a safety plan survey, (ii) recording at least one characteristic of the stalkerware, and (iii) generating a predicted harassment threat profile for the user based on the recorded responses and the recorded characteristic. In one embodiment, the computer-implemented method may further include aggregating recorded data from multiple users and updating a model used to generate the predicted harassment threat profile based on the aggregated recorded data.

In some embodiments, identifying the device that is operated by the user and that includes the private data pertaining to the user may include identifying a server that stores the private data in a data storage account on behalf of the user. Similarly, determining that stalkerware on the device is sending the private data to the unauthorized device not operated by the user may include determining that the stalkerware on the device is sending the private data to a data storage account on a server that is not authorized by the user to store the private data on behalf of the user. In some embodiments, determining that stalkerware on the device is sending the private data to an unauthorized device not operated by the user may include determining that the stalkerware is saving the private data to local storage on the device for later transfer to the unauthorized device.

In one embodiment, a system for implementing the above-described method may include at least one physical processor and physical memory that includes computer-executable instructions that, when executed by the physical processor, cause the physical processor to (i) identify a device that is operated by a user and that includes private data pertaining to the user, (ii) determine that stalkerware on the device is sending the private data to an unauthorized device not operated by the user, (iii) request, in response to determining that the stalkerware is sending the private data to the unauthorized device, that the user select at least one safety plan step from a set of safety plan options, and (iv) modify, at least in part based on the safety plan step selected by the user, outgoing data sent by the stalkerware to the unauthorized device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a device that is operated by a user and that includes private data pertaining to the user, (ii) determine that stalkerware on the device is sending the private data to an unauthorized device not operated by the user, (iii) request, in response to determining that the stalkerware is sending the private data to the unauthorized device, that the user select at least one safety plan step from a set of safety plan options, and (iv) modify, at least in part based on the safety plan step selected by the user, outgoing data sent by the stalkerware to the unauthorized device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
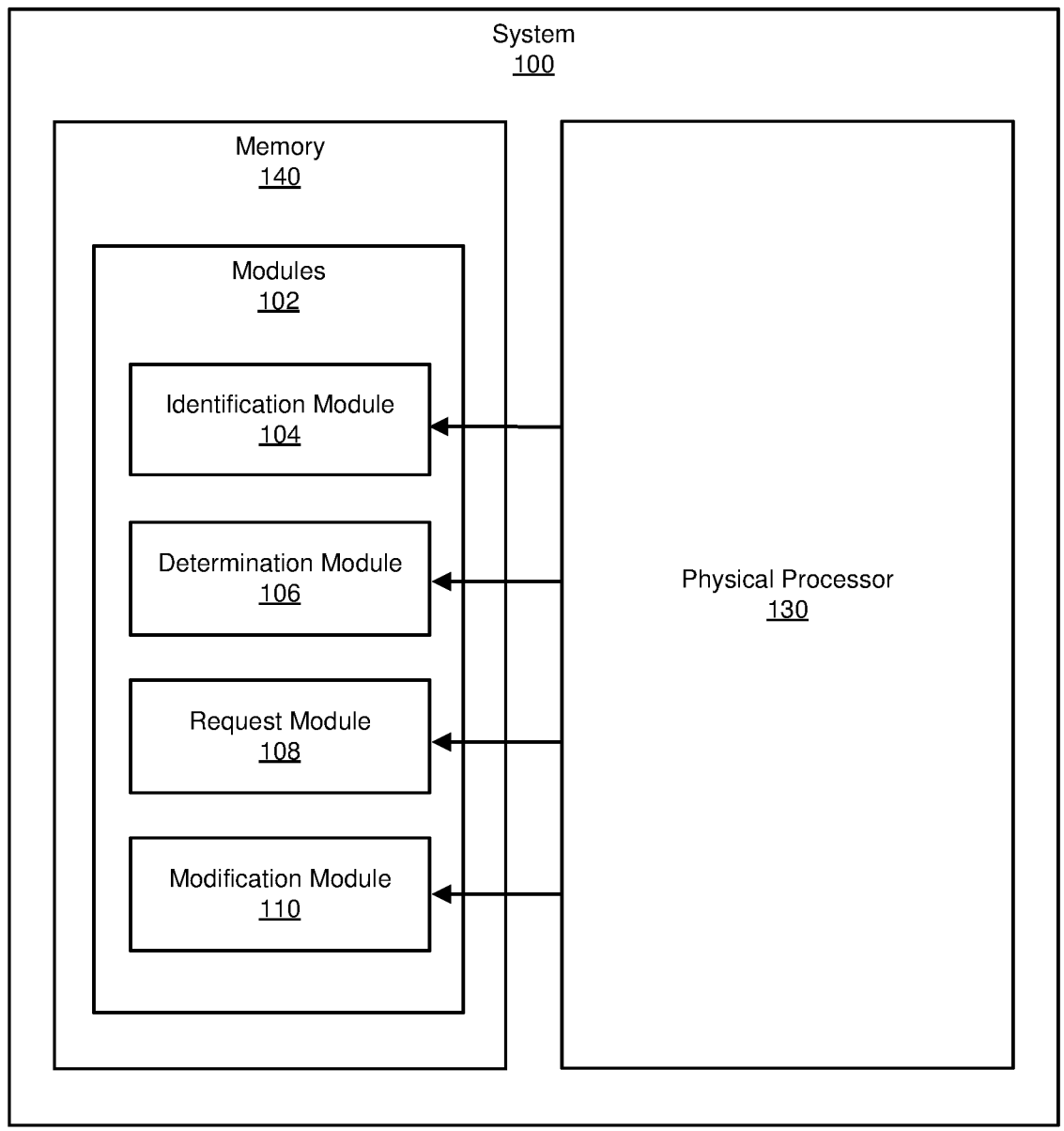
FIG. 1 is a block diagram of an exemplary system for protecting data on devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for protecting data on devices. As will be explained in greater detail below, by collecting information about a user's unique personal situation, identifying physical and other threats that the user is likely to face, and then creating and acting on a custom safety plan, the systems described herein may protect a user's data from stalkerware while reducing the chances of the user suffering retribution from the owner of the stalkerware. Additionally, by using anonymized data about previous situations as training data, the systems described herein may continuously improve threat estimation and present users with increasingly effective suggestions for maintaining or improving their personal safety while in the process of leaving an abuser.

In some embodiments, the systems described herein may improve the functioning of a computing device by protecting private data on the device from stalkerware without compromising the safety of the operator of the device. Additionally or alternatively, the systems described herein may improve the fields of anti-malware applications and/or data protection by providing customized ways to remove or mitigate the damage from stalkerware applications without alerting the owner of the stalkerware application.

The following will provide, with reference to FIGS. 1, 2, 4, and 5, detailed descriptions of exemplary systems for protecting data on devices. Detailed descriptions of corresponding computer-implemented methods will also be provided in connection with FIGS. 3 and 6. In addition, detailed descriptions of an exemplary computing system and network architecture capable of implementing one or more of the embodiments described herein will be provided in connection with FIGS. 7 and 8, respectively.

FIG. 1 is a block diagram of example system 100 for protecting data on devices. As illustrated in this figure, example system 100 may include one or more modules 102 for performing one or more tasks. For example, and as will be explained in greater detail below, example system 100 may include an identification module 104 that identifies a device that is operated by a user and that includes private data pertaining to the user. Example system 100 may additionally include a determination module 106 that determines that stalkerware on the device is sending the private data to an unauthorized device not operated by the user. Example system 100 may also include a request module 108 that requests, in response to determining that the stalkerware is sending the private data to the unauthorized device, that the user select at least one safety plan step from a set of safety plan options. Example system 100 may additionally include a modification module 110 that modifies, at least in part based on the safety plan step selected by the user, outgoing data sent by the stalkerware to the unauthorized device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting data on devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
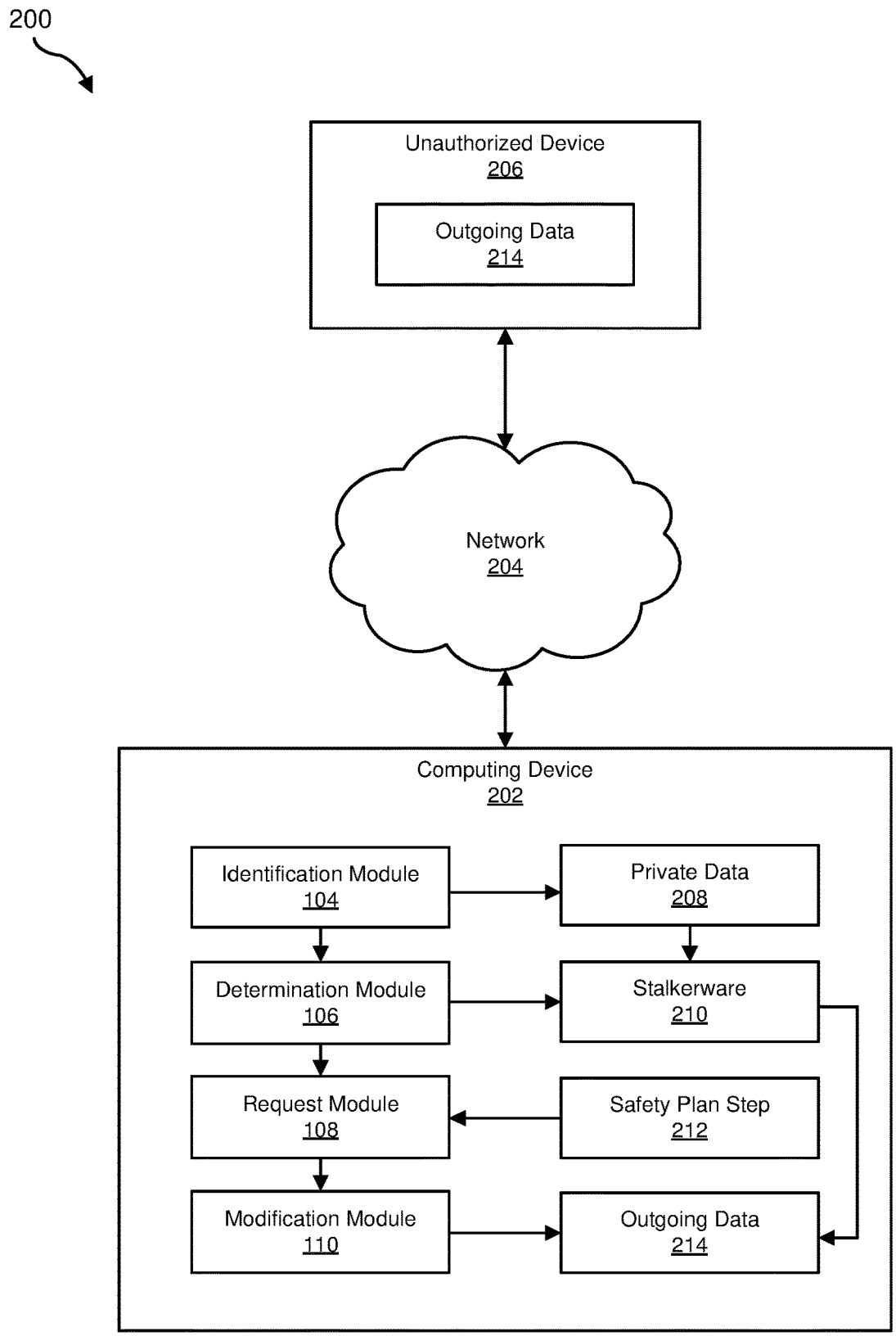
FIG. 2 is a block diagram of an additional exemplary system for protecting data on devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an unauthorized device 206 via a network 204. In one example, computing device 202 may be programmed with one or more of modules 102.

In one embodiment, one or more of modules 102 from FIG. 1 may, when executed by at least one processor of computing device 202, enable computing device 202 to protect data on devices. For example, and as will be described in greater detail below, identification module 104 may identify computing device 202 that is operated by a user and that stores or accesses private data 208 pertaining to the user. At some later point, determination module 106 may determine that stalkerware 210 on computing device 202 is sending private data 208 to an unauthorized device 206 not operated by the user. Request module 108 may request, in response to determining that stalkerware 210 is sending private data 208 to unauthorized device 206, that the user select at least one safety plan step 212 from a set of safety plan options. Modification module 110 may modify, at least in part based on safety plan step 212 selected by the user, outgoing data 214 sent by stalkerware 210 to unauthorized device 206.

Computing device 202 generally represents any type or form of computing device capable of reading computer-executable instructions. For example, computing device 202 may be a personal computing device such as a laptop or smart phone configured with privacy-protecting software. In another example, computing device 202 may represent a cloud server that stores data from a user's personal device. Additional examples of computing device 202 include, without limitation, tablets, desktops, servers of all types, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Unauthorized device 206 generally represents any type or form of computing device that is capable of receiving transmitted data and is not operated by the user. For example, unauthorized device 206 may be a personal computing device such as a laptop or smart phone that belongs to an intimate partner of the user and is configured to receive data from the stalkerware. In other examples, unauthorized device 206 may be a server that receives the data transmitted by the stalkerware, such as a cloud server. Additionally or alternatively, the stalkerware may transmit data to a server from which the data is retrieved by unauthorized device 206. Additional examples of unauthorized device 206 include, without limitation, tablets, desktops, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and unauthorized device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Private data 208 generally represents any type or form of non-public digital data pertaining to a user. For example, private data 208 may be data that the user does not share with any other users or devices. In another example, private data 208 may be data that the user shares with only a specific set of other users or devices. Examples of private data 208 may include, without limitation, location data, audio data, visual data, communication data (e.g., emails, social media data, contact lists, telecommunication data such as phone records and text messages, etc.), financial data, medical data, confidential data, and/or proprietary data.

Stalkerware 210 generally represents any type or form of application that transmits private data to one or more unauthorized devices. In some examples, stalkerware 210 may be specifically designed to collect data on an individual user and transmit that data to the owner of stalkerware 210. In other examples, stalkerware 210 may be generic malware that is designed to collect data on a large number of users and transmit that data to the owner of stalkerware 210 but which has been installed on the user's device by an associate of the user to collect data on the user specifically. In some examples, stalkerware 210 may access one or more hardware elements of a device, such as a camera, microphone, and/or location sensor to collect private data recorded by the hardware element. Additionally or alternatively, stalkerware 210 may intercept data sent to/from other applications and/or may directly access other applications on a device, such as a web browser, social media applications, financial applications, telecommunications applications, and/or any other relevant applications that store, access, and/or generate personal data.

Safety plan step 212 generally represents any action taken by a user and/or application to maintain or improve the user's safety. In some examples, safety plan step 212 may be performed entirely by an application, such as filtering data accessible to a stalkerware application. Additionally or alternatively, safety plan step 212 may be performed partially by an application and partially by a user, such as assisting a user in configuring a password manager for additional applications.

Outgoing data 214 generally represents any type or form of data transmitted by stalkerware. In some embodiments, stalkerware 210 may transmit all private data collected by stalkerware 210. In other embodiments, stalkerware 210 may filter, analyze, and/or otherwise process data and may transmit a transformed version and/or subset of private date collected by stalkerware 210. In some examples, stalkerware 210 may transmit additional information that is not private data, such as the current status of stalkerware 210 (e.g., functioning, partially functioning, in the process of being deleted, etc.).

Figure 3:
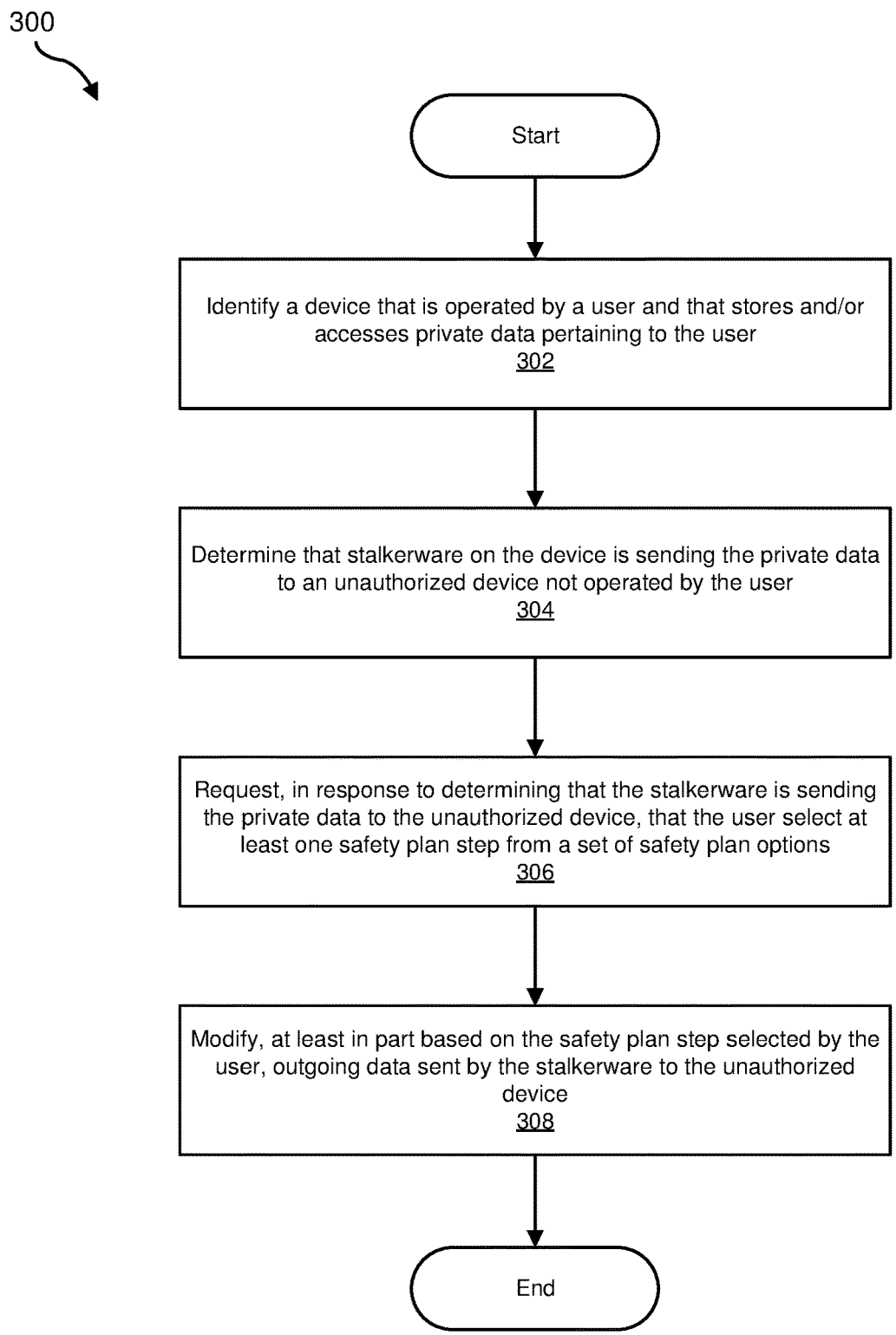
FIG. 3 is a flow diagram of an exemplary method for protecting data on devices.

FIG. 3 is a flow diagram of an example computer-implemented method 300 for protecting data on devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a device that is operated by a user and that stores and/or accesses private data pertaining to the user. For example, identification module 104 may, as part of computing device 202 in FIG. 2, identify computing device 202 that is operated by a user and that stores and/or accesses private data 208 pertaining to the user.

Identification module 104 may identify the computing device in a variety of ways and/or contexts. For example, identification module 104 may be part of an anti-malware app or other type of security or privacy application installed on a mobile device. In some embodiments, identification module 104 may identify a server that stores the user's private data. For example, the user's mobile device may automatically upload data of certain types (e.g., photos, audio recordings, etc.) to a data storage account on a cloud server.

In some embodiments, identification module 104 may identify private data pertaining to the user that is collected by a hardware element of the device. For example, the private data may include audio data collected by a microphone of the device, visual data collected by a camera of the device, and/or location data collected by a location tracker of the device. In some examples, the user may intentionally collect the data and the stalkerware may intercept the collected data. For example, the user may intentionally record a video via a camera which the stalkerware may intercept and transmit. In other examples, the stalkerware may activate the hardware element of the device to collect the data. For example, stalkerware may activate a location tracker, such as a global positioning system (GPS) sensor, that is not currently being used by any legitimate application. In another example, stalkerware may activate a microphone to record audio while leaving the user unaware that audio is being recorded.

Additionally or alternatively, identification module 104 may identify private data pertaining to the user that includes financial data, telecommunication data, social media data, and/or contact list data. In some examples, the private data may be stored directly on the device, such as a contact list that is stored in a phone app. In other examples, the private data may be stored on servers and accessed by the device, such as bank records that the device accesses via a web browser and/or banking app.

At step 304, one or more of the systems described herein may determine that stalkerware on the device is sending the private data to an unauthorized device not operated by the user. For example, determination module 106 may, as part of computing device 202 in FIG. 2, determine that stalkerware 210 on computing device 202 is sending private data 208 to unauthorized device 206 not operated by the user.

Determination module 106 may determine that the stalkerware is sending private data to an unauthorized device in a variety of ways. For example, determination module 106 may monitor application activity on the device and discover suspicious activity by the stalkerware (e.g., accessing data from other applications, activating hardware elements, etc.). In another example, determination module 106 may monitor incoming and/or outgoing data transmissions and may detect that the stalkerware is sending private data. Additionally or alternatively, determination module 106 may scan the device using a heuristic that identifies likely stalkerware and/or a database of known stalkerware signatures and may identify the stalkerware based on the results of the scan. In some embodiments, the systems described herein may monitor the stalkerware for a period of time to determine the types of data accessed by the stalkerware and/or other behavior patterns of the stalkerware.

In some embodiments, determination module 106 may determine that the stalkerware is sending the private data to a server. For example, the stalkerware may upload the private data to a data storage account on a cloud server that is associated with the operator of the stalkerware. In some examples, the stalkerware may copy data from a data storage account associated with the user to a data storage account associated with the operator of the stalkerware. The data storage account associated with the operator of the stalkerware may not be authorized by the user to store the user's private data. These data storage accounts may be on the same or different servers. In some embodiments, the server itself may be the unauthorized device. Additionally or alternatively, the unauthorized device may be a personal computing device used to access the private data that is sent to the server by the stalkerware. In some embodiments, the stalkerware and/or cloud server may send updates about the private data to a personal computing device of the operator of the stalkerware (e.g., via text messaging and/or email). Although described above as a single server, the term "cloud server" may represent one or more physical and/or virtual servers operating in conjunction.

In one embodiment, determination module 106 may determine that the stalkerware is saving the private data to local storage on the device for later transfer to the unauthorized device. For example, a silent automatic call recorder may collect call recordings on a mobile phone but may not have functionality to export the recordings to another device. In one example, the operator of the stalkerware may rely on physical access to the device and/or on knowledge of credentials for the device to retrieve the data from the device at a later time. For example, the operator of the stalkerware may send the data from the local storage on the user's device to the unauthorized device by uploading the data manually, transferring the data via a physical cable, transferring the data via a near-field communication protocol, and/or emailing the data. In another example, the operator of the stalkerware may utilize a backup service running on the device that can transfer the data from the device rather than having the stalkerware itself transfer the data directly. For instance, the stalkerware may write the private data a location where the private data can be read by an automatic data backup service, which may back the data up to a data storage account on a server that is accessible to the operator of the stalkerware.

In some examples, determination module 106 may determine that the unauthorized device is operated by a personal associate of the user. For example, determination module 106 may identify the unauthorized device based on an identifier of the device (e.g., a BLUETOOTH fingerprint and/or identifier, a device name, a network address, etc.) and may determine the owner of the device based on the identity of the device. In another example, determination module 106 may identify the personal associate of the user based on an identifier of a data storage account to which the stalkerware is sending the private data. In one example, determination module 106 may provide the user with information about the device and/or data storage account and may receive input from the user indicating that the owner of the device and/or account is a personal associate of the user. The term "personal associate," as used herein, generally refers to any person known to the user, including an intimate partner, a colleague, a roommate, a friend, and so forth. By contrast, an unknown malicious actor who infected the device with malware via the Internet may not be a personal associate of the user.

Figure 4:
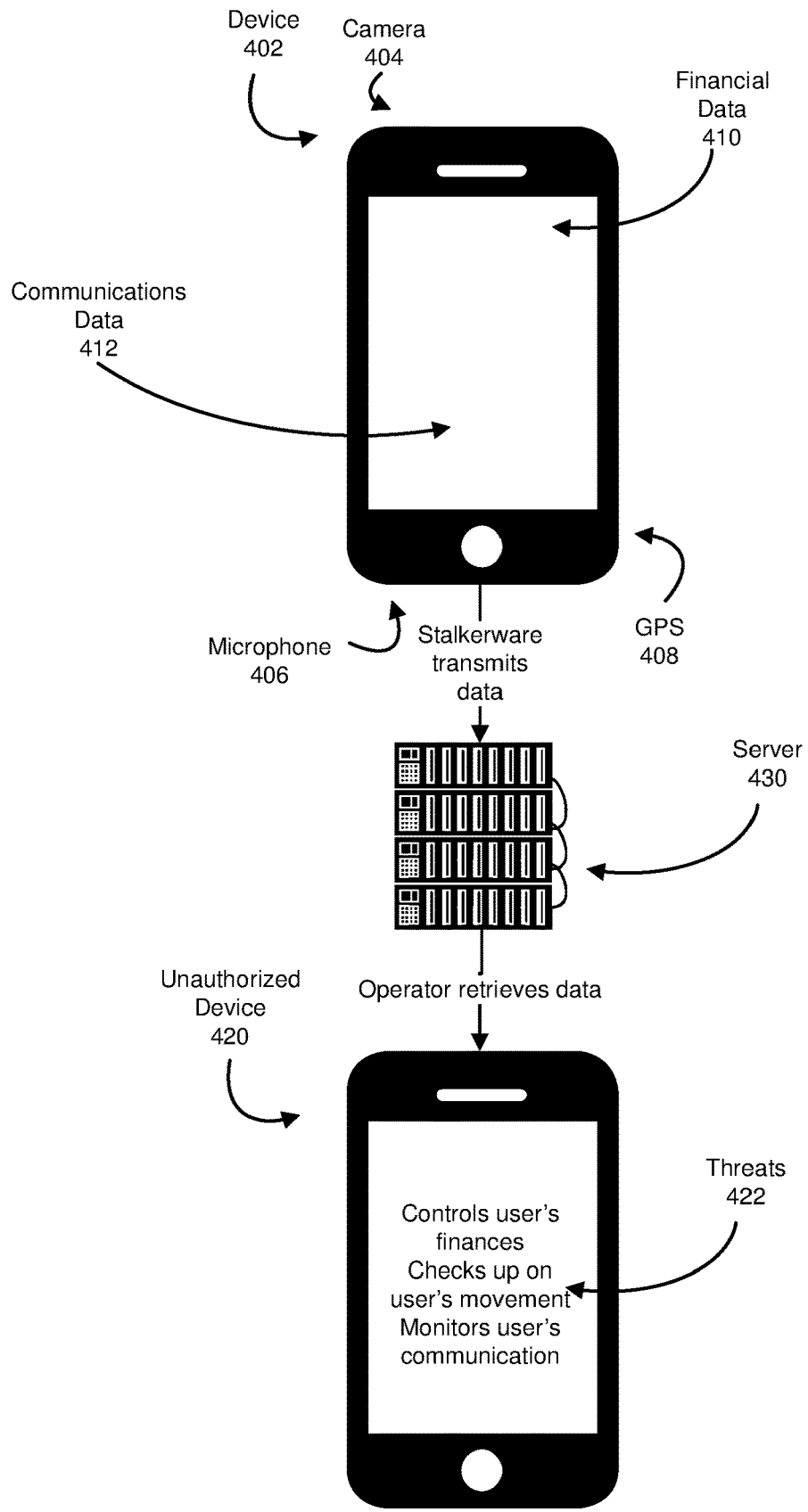
FIG. 4 is a block diagram of an example computing system for protecting data on devices.

The systems described herein may identify a variety of potential threats presented by stalkerware based on the type of data gathered by the stalkerware. For example, as illustrated in FIG. 4, stalkerware on a device 402 may collect and/or transmit data from a camera 404, a microphone 406, and/or a GPS 408 to an unauthorized device 420. Additionally or alternatively, the stalkerware may transmit financial data 410 and/or communications data 412 to unauthorized device 420. In some embodiments, the stalkerware may transmit the data to unauthorized device 420 via a server 430. For example, the stalkerware may upload the data to a cloud storage account accessible to the operator of unauthorized device 420 who may later retrieve the data from server 430. Based on the type of private data transmitted to unauthorized device 420, the systems described herein may determine which threats 422 are most likely to be faced by the user. For example, the operator of unauthorized device 420 may use financial data 410 to control the user's finances, check up on the user's movements via data from GPS 408, and/or monitor the user's communication via communications data 412.

In one embodiment, systems described herein may record responses from the user to a safety plan survey, record at least one characteristic of the stalkerware (e.g., the type of data accessed), and generate a predicted harassment threat profile for the user based on the recorded responses and the recorded characteristic. Questions in the safety plan survey may be safety-relevant questions, such as the current relationship between the user and a suspected operator of the stalkerware, the level of access to the user's devices and/or accounts possessed by the suspected operator of the stalkerware, whether the suspected operator of the stalkerware has behaved in threatening and/or dangerous ways, what options the user has for seeking safety, and/or any other questions relevant to the safety of the user. In some embodiments, the systems described herein may create a priority ranking of likely harassment threats. For example, the systems described herein may determine, based on the stalkerware accessing data from GPS 408 and the user indicating that the owner of the stalkerware lives near the user, that the user may be at heightened risk of physical harassment or violence. In some embodiments, the systems described herein may generate a set of safety plan options based at least in part on threats 422. In some embodiments, set of safety plan options 422 may include a custom safety plan that may be edited and/or reviewed by the user. For example, the systems described herein may generate a set of recommended steps for the user to take to leave an abusive partner (i.e., the suspected operator of the stalkerware) and the user may approve, remove, and/or rearrange steps.

Returning to FIG. 3, at step 306, one or more of the systems described herein may request, in response to determining that the stalkerware is sending the private data to the unauthorized device, that the user select at least one safety plan step from a set of safety plan options. For example, request module 108 may, as part of computing device 202 in FIG. 2, request, in response to determining that stalkerware 210 is sending private data 208 to unauthorized device 206, that the user select at least one safety plan step 212 from a set of safety plan options.

Request module 108 may request that the user select at least one safety plan step in a variety of ways. For example, request module 108 may present the user with a set of default safety plan steps. In some examples, request module 108 may present the user with a set of safety plan steps generated based on characteristics of the stalkerware. In another example, request module 108 may request input from the user before generating a set of safety plan steps.

In some examples, request module 108 may identify at least one characteristic of the stalkerware and generate the set of safety plan options based on the characteristic. For example, if the stalkerware is transmitting the user's financial data from a banking website, request module 108 may generate a safety plan option that includes helping the user set up multi-factor authentication (MFA) for their banking website. In another example, if the stalkerware is transmitting the user's location and/or communication, request module 108 may generate a set of safety plan options geared towards preserving the user's physical safety.

Additionally or alternatively, request module 108 may query the user about the user's physical safety, the user's proximity to a suspected operator of the unauthorized device (e.g., an abusive partner or former partner), a level of access that a suspected operator of the unauthorized device has to the device (e.g., does the suspected operator have physical access), and/or a level of access that a suspected operator of the unauthorized device has to accounts owned by the user (e.g., does the suspected operator know the passwords, is the suspected operator listed as an authorized user, etc.). In some cases, a user may face different physical and/or digital threats from a current partner that lives with the user and has physical access to the user's devices versus a former partner who does not live with the user or have access to the user's devices. By gathering information about the user's relationship status, the systems described herein may create a custom safety plan that is tailored to the user's situation.

Figure 5:
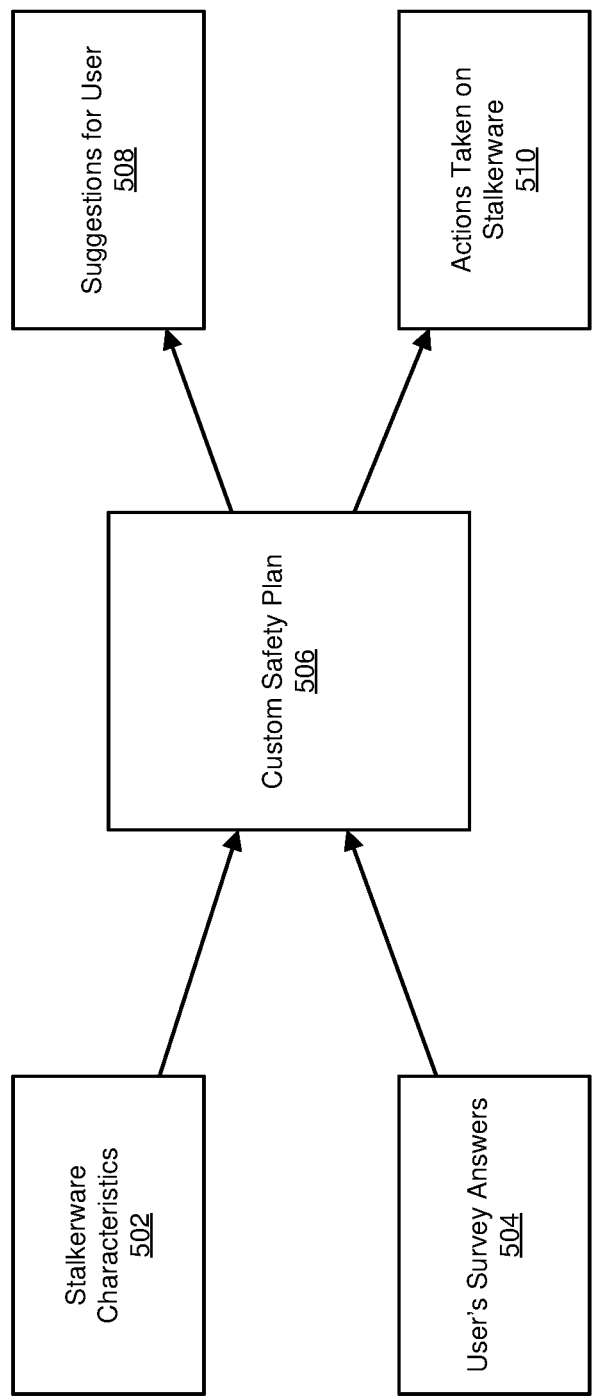
FIG. 5 is a block diagram of an example computing system for protecting data on devices.

In some embodiments, the systems described herein may generate a custom safety plan for the user based on a combination of factors. For example, as illustrated in FIG. 5, the systems described herein may analyze stalkerware characteristics 502 in combination with the user's survey plan answers 504 to generate a custom safety plan 506. Custom safety plan 506 may include suggestions for the user 508 and/or actions taken on the stalkerware 510.

In some examples, the set of safety plan options may include an option to provide an emergency contact, an option to update authentication information on at least one platform, and/or an option to initiate protection of personal information stored on third-party platforms. In one example, the systems described herein may contact the emergency contact if certain conditions are met, such as the user activating the emergency contact by pressing a button or interacting with an interface element and/or the user failing to check in at a certain time. In some examples, the systems described herein may help the user update authentication information by prompting the user to change passwords for various sensitive apps and/or websites, helping the user configure MFA, and/or helping the user configure a password manager that stores strong passwords securely. In one embodiment, the systems described herein may partner with a personal information protection service and may assist the user in setting up the personal information protection service. Additionally or alternatively, the systems described herein may assist the user with freezing their credit, removing an authorized user from their accounts, and/or other relevant steps to protect the user's assets and/or information.

In some embodiments, the set of safety plan options may include an option to delete the stalkerware, an option to filter data accessible to the stalkerware, and/or an option to spoof data from the stalkerware. In some examples, the systems described herein may select among the aforementioned options based in part on the user's current situation. For example, if the user currently lives with the suspected owner of the stalkerware, deleting the stalkerware may trigger a violent confrontation that is unsafe for the user. In this example, spoofing data from the stalkerware may preserve or increase the user's safety by convincing the owner of the stalkerware that the stalkerware is still functioning but keeping crucial information, such as conversations with a domestic violence advocate or visits to a police station, from the owner of the stalkerware. In another example, if the user does not live with the suspected owner of the stalkerware, deleting the stalkerware immediately may preserve the user's privacy without increasing the user's physical risk. In some examples, a user who is not at physical risk may nonetheless wish to continue monitoring the behavior of the stalkerware to gain a clearer picture of the types of data being accessed by the stalkerware.

Returning to FIG. 3, at step 308, one or more of the systems described herein may modify, at least in part based on the safety plan step selected by the user, outgoing data sent by the stalkerware to the unauthorized device. For example, modification module 110 may, as part of computing device 202 in FIG. 2, modify, at least in part based on safety plan step 212 selected by the user, outgoing data 214 sent by stalkerware 210 to unauthorized device 206.

Modification module 110 may modify the outgoing data sent by the stalkerware in a variety of ways. In some examples, modification module 110 may modify the outgoing data sent by the stalkerware to the unauthorized device by preventing the stalkerware from sending data indicating that the stalkerware has been deleted from the device and then deleting the stalkerware. For example, modification module 110 may temporarily disable network access for the device (e.g., by turning on airplane mode) and may then delete the stalkerware. In another example, modification module 110 may intercept an outgoing message from the stalkerware about the stalkerware's removal.

In some examples, modification module 110 may modify the outgoing data sent by the stalkerware to the unauthorized device by filtering incoming data to the stalkerware to limit at least one of the quantity or accuracy of the outgoing data sent by the stalkerware. For example, modification module 110 may remove conversations with certain contacts and/or visits to certain locations from the data that is accessible to the stalkerware. In another example, modification module 110 may modify the totals of financial transactions in data from a financial application that is being intercepted by the stalkerware. In some embodiments, modification module 110 may modify incoming data to the stalkerware by using the device's permissions manager to remove the stalkerware's permissions to access certain applications and/or hardware elements on the device. For example, modification module 110 may disable the stalkerware's access to the microphone.

Figure 6:
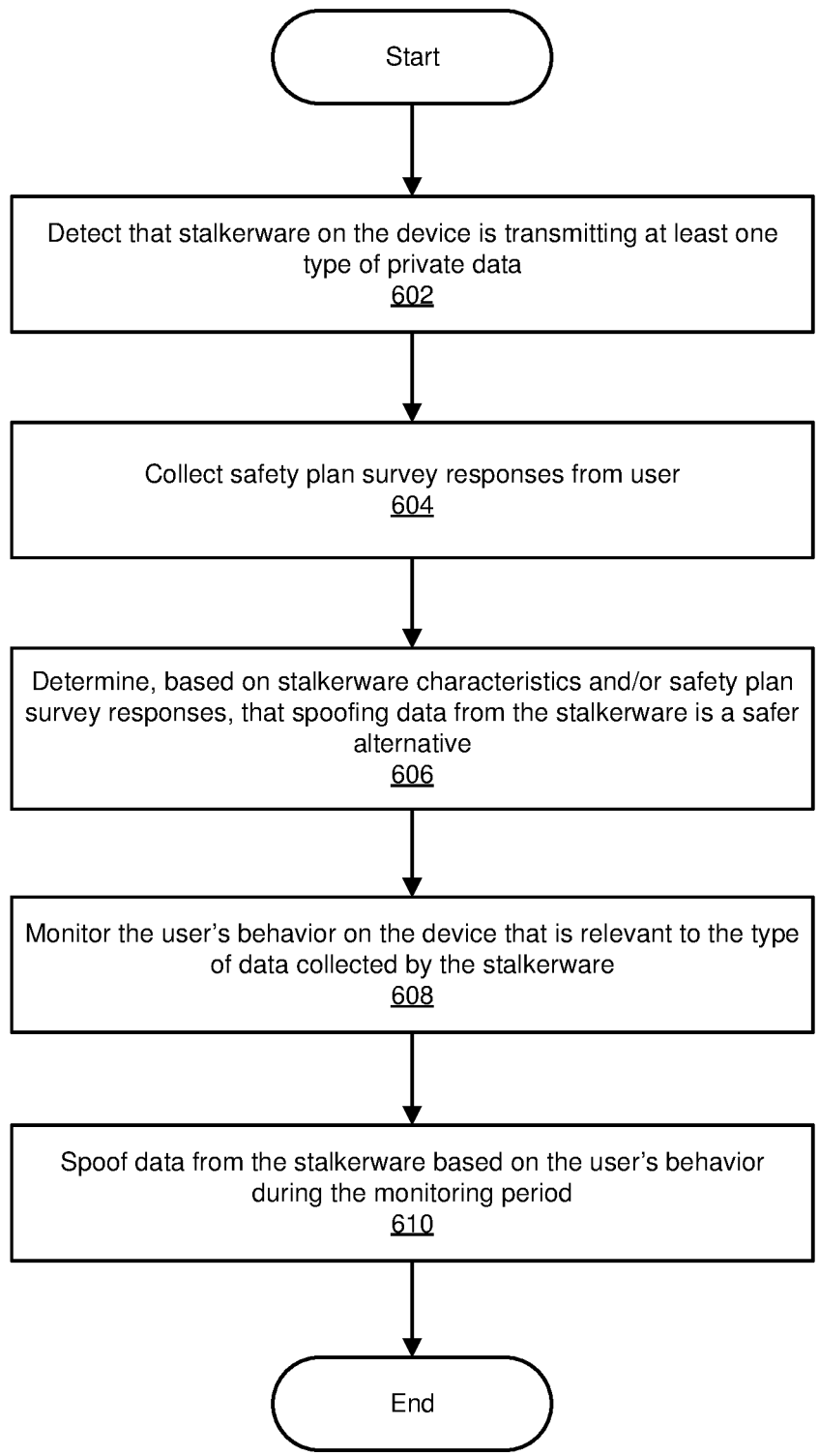
FIG. 6 is flow diagram of an exemplary method for protecting data on devices.

In some examples, modification module 110 may modify the outgoing data sent by the stalkerware to the unauthorized device by monitoring behavior of the user on the device over a period of time to build a profile of data generated by the user, generating spoofed data based on the profile of data generated by the user, and replacing the outgoing data sent by the stalkerware with the spoofed data. FIG. 6 is a flow diagram of an example method for protecting private data by spoofing data after a monitoring period. In one example, at step 602, the systems described herein may detect that stalkerware on the device is transmitting at least one type of private data. At step 604, the systems described herein may collect safety plan survey responses from the user.

In some examples, at step 606, the systems described herein may determine, based on stalkerware characteristics and/or safety plan survey responses, that spoofing data from the stalkerware is a safer alternative than deleting the stalkerware. Following that determination, at step 608, the systems described herein may monitor the user's behavior on the device that is relevant to the type of data collected by the stalkerware. For example, if the stalkerware is collecting location data, the systems described herein may monitor the user's location. In another example, if the stalkerware is collecting the user's financial data, the systems described herein may monitor the user's financial transactions. In some embodiments, the systems described herein may also monitor the behavior of the stalkerware. For example, the systems described herein may monitor the format of the messages sent by the stalkerware, the frequency of the messages, the timing of the messages, and/or any other patterns of the messages in order to convincingly spoof the messages.

At step 610, the systems described herein may spoof data from the stalkerware based on the user's behavior during the monitoring period. For example, the systems described herein may monitor a user's location data for a set period of time (e.g., one week, two weeks, one month) to determine a pattern of locations typically visited by the user. Modification module 110 may then send data that is broadly consistent with this pattern on behalf of the stalkerware while preventing the stalkerware from sending any data that indicates an accurate location of the user. In another example, the systems described herein may monitor the user's financial transactions and modification module 110 may send spoofed financial data that resembles the user's typical pattern of financial transactions.

In some examples, modification module 110 may modify the outgoing data sent by the stalkerware to the unauthorized device by identifying a subset of the private data that may cause a higher level of potential harm to the user if transmitted to the unauthorized device compared to private data not in the subset and filtering the subset of the private data from the outgoing data while allowing the stalkerware to continue sending the private data not in the subset. For example, modification module 110 may allow the stalkerware to continue sending accurate location data for most locations but may prevent the stalkerware from sending location data when the user visits a police station or domestic violence shelter. In another example, modification module 110 may allow the stalkerware to continue sending accurate communication data for most communications but may prevent the stalkerware from sending information about conversations with members of law enforcement, specific family members, and/or domestic violence counselors.

In some embodiments, the systems described herein may improve recommendations over time based on the safety plan options selected by users in different situations. In one embodiment, systems described herein may aggregate recorded data from multiple users and update a model (e.g., a machine learning model) used to generate predicted harassment threat profiles based on the aggregated recorded data. In one embodiment, the systems described herein may build a database of aggregated data that includes the type of data accessed by the stalkerware, the behavior of the stalkerware (e.g., the type and/or pattern of messages sent by the stalkerware), the user's answers to a safety plan survey, device usage behavior of the user (e.g., the apps used most frequently by the user), and/or the safety plan options selected by the user. In some embodiments, the systems described herein may anonymize the collected data, for example via federated learning.

As explained above in connection with method 300 in FIG. 3, the systems and methods described herein may maintain or increase the safety of users who discover stalkerware on their devices by analyzing the threats faced by the user and creating a custom safety plan based on the user's personal situation. By determining the most likely threats faced by the user and recommending a set of safety plans steps prioritized to protect the user's safety, then allowing the user's responses to guide the actions taken on the user's behalf, the systems described herein may assist users in safely leaving dangerous situations while preserving as much of the user's data privacy as is practical.

Figure 7:
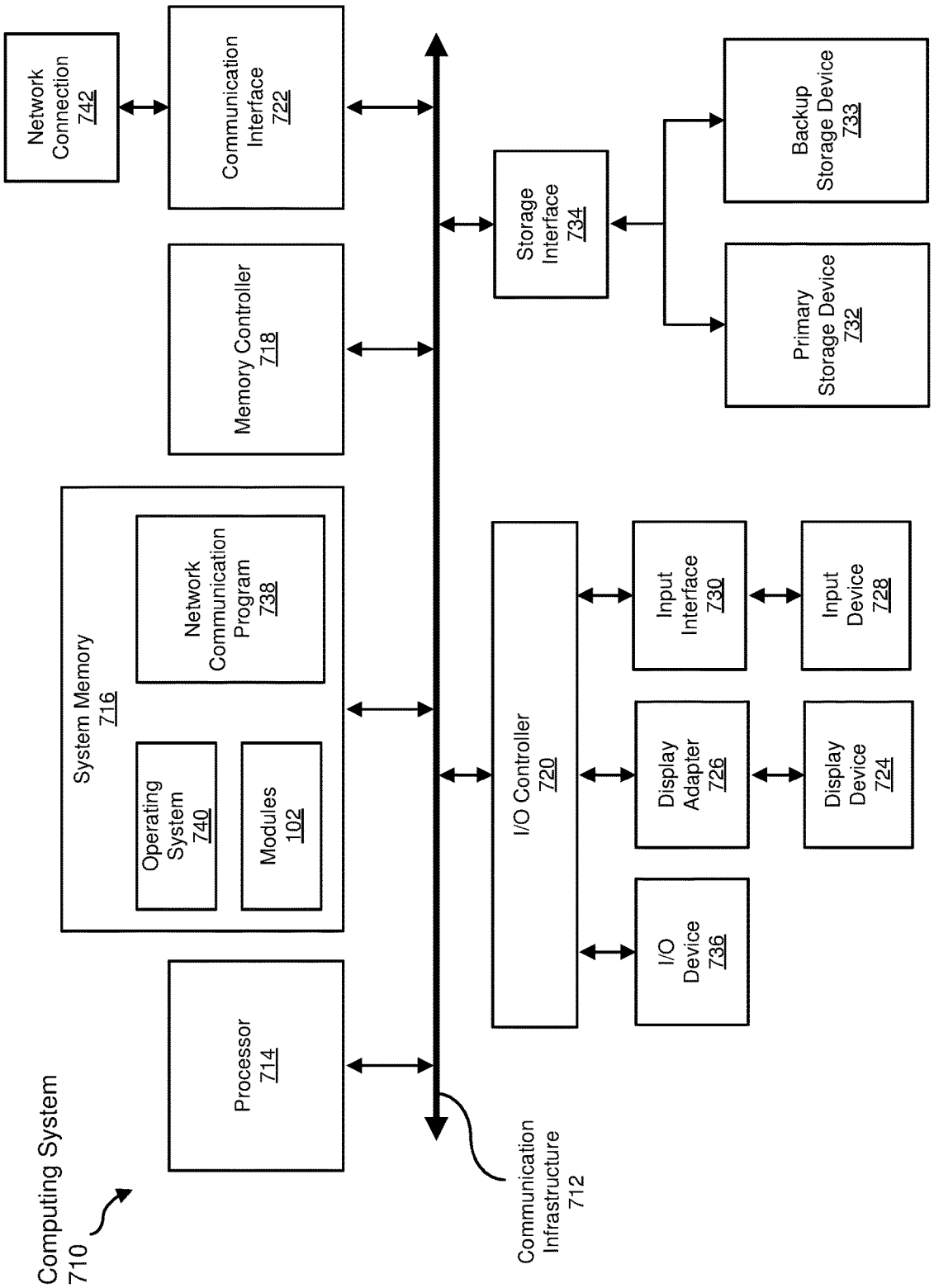
FIG. 7 is a block diagram of an exemplary computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
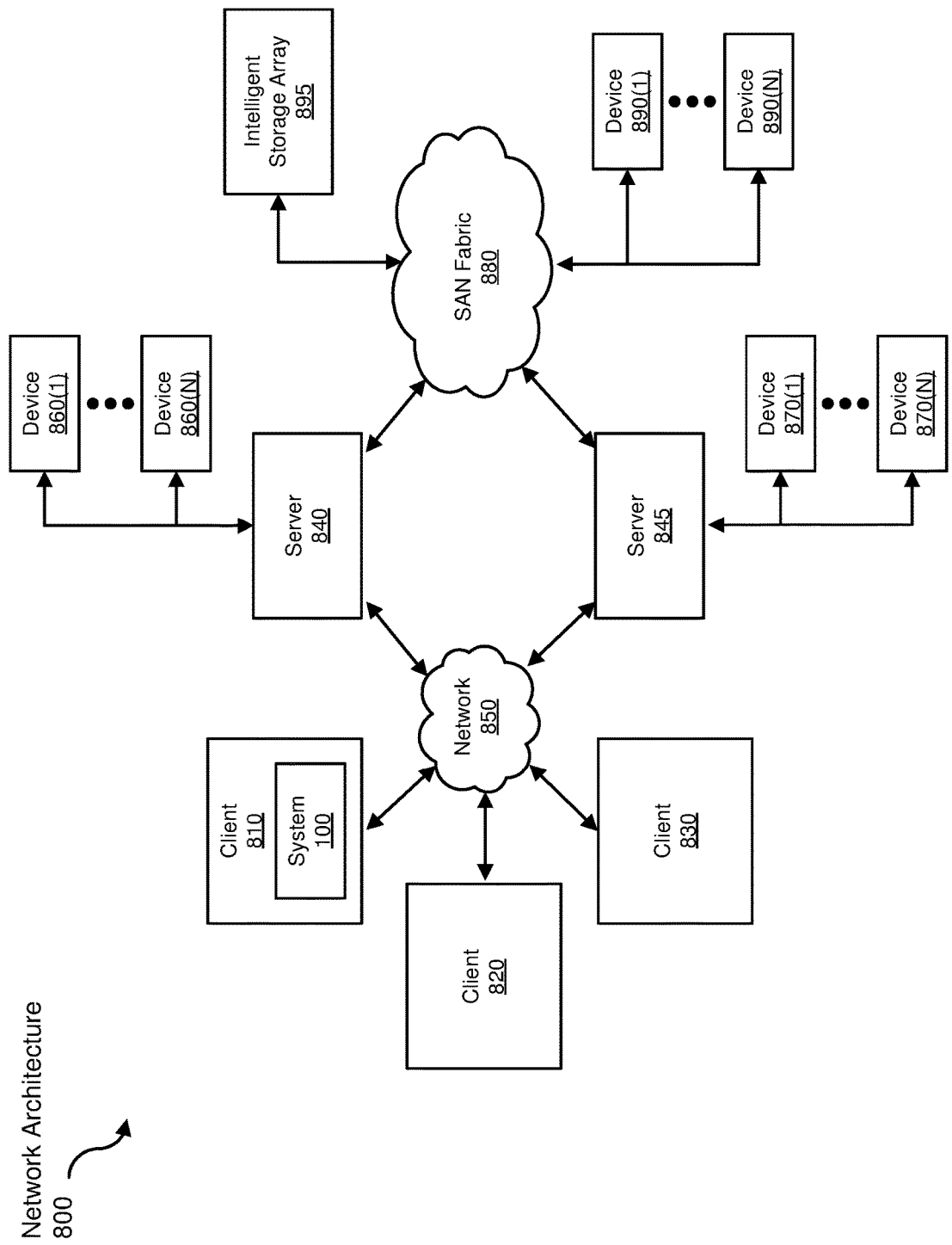
FIG. 8 is a block diagram of an exemplary computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for protecting data on devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive private data to be transformed, transform the private data by redacting and/or altering some portions of the private data, output a result of the transformation to prevent stalkerware from having access to the unredacted data, use the result of the transformation to limit and/or spoof stalkerware data, and store the result of the transformation to a log for later reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting data on devices, at least a portion of the method being performed by a computing device comprising at least one processor, the method comprising:
    identifying a device that is operated by a user and that comprises private data pertaining to the user;
    determining that stalkerware installed on the device is collecting the private data and sending the private data to an unauthorized device not operated by the user;
    requesting, in response to determining that the stalkerware is sending the private data to the unauthorized device, that the user select at least one safety plan step from a set of safety plan options; and
    modifying, at least in part based on the safety plan step selected by the user, outgoing data sent by the stalkerware to the unauthorized device, thereby providing the unauthorized device with spoofed data instead of the private data.

2. The computer-implemented method of claim 1, wherein the private data pertaining to the user comprises data collected by a hardware element of the device, comprising at least one of:
    audio data collected by a microphone of the device;
    visual data collected by a camera of the device; and
    location data collected by a location tracker of the device.

3. The computer-implemented method of claim 1, wherein the private data pertaining to the user comprises at least one of:
    financial data;
    telecommunication data;
    social media data; and
    contact list data.

4. The computer-implemented method of claim 1, wherein determining that the stalkerware on the device is sending the private data to the unauthorized device not operated by the user comprises determining that the unauthorized device is operated by a personal associate of the user.

5. The computer-implemented method of claim 1, wherein requesting that the user select at least one safety plan step from the set of safety plan options comprises:
    identifying at least one characteristic of the stalkerware; and
    generating the set of safety plan options based on the characteristic.

6. The computer-implemented method of claim 1, wherein the set of safety plan options comprises at least one of:
    an option to delete the stalkerware;
    an option to filter data accessible to the stalkerware; and
    an option to spoof data from the stalkerware.

7. The computer-implemented method of claim 1, wherein the set of safety plan options comprises at least one of:
    an option to provide an emergency contact;
    an option to update authentication information on at least one platform; and
    an option to initiate protection of personal information stored on third-party platforms.

8. The computer-implemented method of claim 1, wherein requesting that the user select the at least one safety plan step comprises querying the user about at least one of:
    physical safety of the user;
    proximity of the user to a suspected operator of the unauthorized device;
    a level of access that a suspected operator of the unauthorized device has to the device; and
    a level of access that a suspected operator of the unauthorized device has to accounts owned by the user.

9. The computer-implemented method of claim 1, wherein modifying the outgoing data sent by the stalkerware to the unauthorized device comprises:
    preventing the stalkerware from sending data indicating that the stalkerware has been deleted from the device; and
    deleting the stalkerware.

10. The computer-implemented method of claim 1, wherein modifying the outgoing data sent by the stalkerware to the unauthorized device comprises filtering incoming data to the stalkerware to limit at least one of the quantity or accuracy of the outgoing data sent by the stalkerware.

11. The computer-implemented method of claim 1, wherein modifying the outgoing data sent by the stalkerware to the unauthorized device comprises:
    monitoring behavior of the user on the device over a period of time to build a profile of data generated by the user;
    generating spoofed data based on the profile of data generated by the user; and
    replacing the outgoing data sent by the stalkerware with the spoofed data.

12. The computer-implemented method of claim 1, wherein modifying the outgoing data sent by the stalkerware to the unauthorized device comprises:
    identifying a subset of the private data that comprises a higher level of potential harm to the user if transmitted to the unauthorized device compared to private data not in the subset; and
    filtering the subset of the private data from the outgoing data while allowing the stalkerware to continue sending the private data not in the subset.

13. The computer-implemented method of claim 1, further comprising:
    recording responses from the user to a safety plan survey;
    recording at least one characteristic of the stalkerware; and generating a predicted harassment threat profile for the user based on the recorded responses and the recorded characteristic.

14. The computer-implemented method of claim 13, further comprising:
    aggregating recorded data from multiple users; and
    updating a model used to generate the predicted harassment threat profile based on the aggregated recorded data.

15. The computer-implemented method of claim 1, wherein identifying the device that is operated by the user and that comprises the private data pertaining to the user comprises identifying a server that stores the private data in a data storage account on behalf of the user.

16. The computer-implemented method of claim 1, wherein determining that stalkerware on the device is sending the private data to the unauthorized device not operated by the user comprises determining that the stalkerware on the device is sending the private data to a data storage account on a server that is not authorized by the user to store the private data on behalf of the user.

17. The computer-implemented method of claim 1, wherein determining that stalkerware on the device is sending the private data to an unauthorized device not operated by the user comprises determining that the stalkerware is saving the private data to local storage on the device for later transfer to the unauthorized device.

18. A system for protecting data on devices, the system comprising:
    at least one physical processor; and
    physical memory comprising computer-executable instructions that, when executed by the physical processor, cause the physical processor to:
        identify a device that is operated by a user and that comprises private data pertaining to the user;
        determine that stalkerware installed on the device is collecting the private data and sending the private data to an unauthorized device not operated by the user;
        request, in response to determining that the stalkerware is sending the private data to the unauthorized device, that the user select at least one safety plan step from a set of safety plan options; and
        modify, at least in part based on the safety plan step selected by the user, outgoing data sent by the stalkerware to the unauthorized device, thereby providing the unauthorized device with falsified data instead of the private data.

19. The system of claim 18, wherein the private data pertaining to the user comprises data collected by a hardware element of the device, comprising at least one of:
    audio data collected by a microphone of the device;
    visual data collected by a camera of the device; and
    location data collected by a location tracker of the device.

20. A non-transitory computer-readable medium comprising one or more computer-executable instructions that, when executed by at least one processor of a computing device, cause the computing device to:
    identify a device that is operated by a user and that comprises private data pertaining to the user;
    determine that stalkerware installed on the device on the device is collecting the private data and sending the private data to an unauthorized device not operated by the user;
    request, in response to determining that the stalkerware is sending the private data to the unauthorized device, that the user select at least one safety plan step from a set of safety plan options; and
    modify, at least in part based on the safety plan step selected by the user, outgoing data sent by the stalkerware to the unauthorized device, thereby providing the unauthorized device with falsified data instead of the private data.

* * * * *